(12) United States Patent
Okada et al.

(10) Patent No.: US 10,521,915 B2
(45) Date of Patent: Dec. 31, 2019

(54) DISTANCE MEASUREMENT DEVICE AND DISTANCE MEASUREMENT METHOD

(71) Applicant: FUJITSU LIMITED, Kawasaki-shi, Kanagawa (JP)

(72) Inventors: Yasutaka Okada, Kawasaki (JP); Kimitaka Murashita, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 14 days.

(21) Appl. No.: 15/830,153

(22) Filed: Dec. 4, 2017

(65) Prior Publication Data

US 2018/0165815 A1 Jun. 14, 2018

(30) Foreign Application Priority Data

Dec. 8, 2016 (JP) .................. 2016-238576

(51) Int. Cl.
*G06T 7/13* (2017.01)
*G06T 7/20* (2017.01)
*G08G 1/16* (2006.01)
*G06T 7/50* (2017.01)
*G01C 3/06* (2006.01)
*G06K 9/00* (2006.01)
*G06K 9/46* (2006.01)
*G06T 7/73* (2017.01)
*G06T 7/536* (2017.01)

(52) U.S. Cl.
CPC .................. *G06T 7/13* (2017.01); *G01C 3/06* (2013.01); *G06K 9/00798* (2013.01); *G06K 9/4604* (2013.01); *G06T 7/20* (2013.01); *G06T 7/50* (2017.01); *G06T 7/536* (2017.01); *G06T 7/73* (2017.01); *G08G 1/166* (2013.01); *G08G 1/167* (2013.01); *G06T 2207/30261* (2013.01)

(58) Field of Classification Search
CPC .... G01C 3/06; G06K 9/00798; G06K 9/4604; G06T 7/13; G06T 7/20; G06T 7/50; G06T 7/536; G06T 7/73; G06T 2207/30261; G08G 1/166; G08G 1/167
See application file for complete search history.

(56) References Cited

U.S. PATENT DOCUMENTS

| 5,233,417 | A | * | 8/1993 | Nouso | ................ H04N 5/23254 348/207.99 |
| 10,002,433 | B2 | * | 6/2018 | Kumano | ................... G06T 7/12 |

(Continued)

FOREIGN PATENT DOCUMENTS

| JP | 2010-211578 | 9/2010 |
| JP | 2011-065338 | 3/2011 |
| WO | 2008/065729 | 6/2008 |

*Primary Examiner* — Mekonen T Bekele
(74) *Attorney, Agent, or Firm* — Fujitsu Patent Center

(57) ABSTRACT

A distance measurement device includes a memory, and a processor coupled to the memory and configured to detect a plurality of edge lines from image data received from a camera mounted on a moving object, identify a plurality of first edge lines that are among the detected plurality of edge lines and have a characteristic of a predetermined target object, search coordinates of a second edge line located at the lowest position from among the identified plurality of first edge lines, and measure a distance from the moving object to the predetermined target object based on the searched coordinates of the second edge line and a parameter of the camera.

5 Claims, 14 Drawing Sheets

(56) References Cited

U.S. PATENT DOCUMENTS

| | | | |
|---|---|---|---|
| 2005/0270374 A1* | 12/2005 | Nishida | G05D 1/0246 348/148 |
| 2006/0239509 A1* | 10/2006 | Saito | G06K 9/00798 382/104 |
| 2009/0066490 A1* | 3/2009 | Mitzutani | G06K 9/00362 340/435 |
| 2009/0080697 A1* | 3/2009 | Kishikawa | G01C 15/00 382/103 |
| 2010/0235032 A1* | 9/2010 | Sung | G05D 1/0246 701/25 |
| 2010/0299000 A1* | 11/2010 | Nakamura | B60R 1/00 701/1 |
| 2010/0315214 A1* | 12/2010 | Yano | B60R 1/00 340/435 |
| 2012/0057757 A1* | 3/2012 | Oyama | G06K 9/00798 382/104 |
| 2014/0266858 A1* | 9/2014 | Blanke | G01S 13/867 342/66 |
| 2018/0158203 A1* | 6/2018 | Kanetake | G06T 7/55 |

* cited by examiner

FIG. 2

| FRAME NUMBER | IMAGE DATA |
|---|---|
| 1 | IMAGE DATA OF FRAME NUMBER "1" |
| 2 | IMAGE DATA OF FRAME NUMBER "2" |
| 3 | IMAGE DATA OF FRAME NUMBER "3" |
| ... | ... |

| | 110b |
|---|---|
| HORIZONTAL DIRECTION | dx |
| VERTICAL DIRECTION | dy |
| HEIGHT POSITION | dz |
| DEPRESSION ANGLE | $\theta$ |
| PAN ANGLE | $\psi$ |
| ROTATIONAL ANGLE | $\rho$ |

FIG. 5

| DISTANCE (Dy) FROM CENTER OF IMAGE | ANGLE OF VIEW ($\theta y$) 110c |
|---|---|
| 0 | 0 |
| 1 | 0.25 |
| ... | ... |
| 239 | 59.75 |
| 240 | 60.00 |

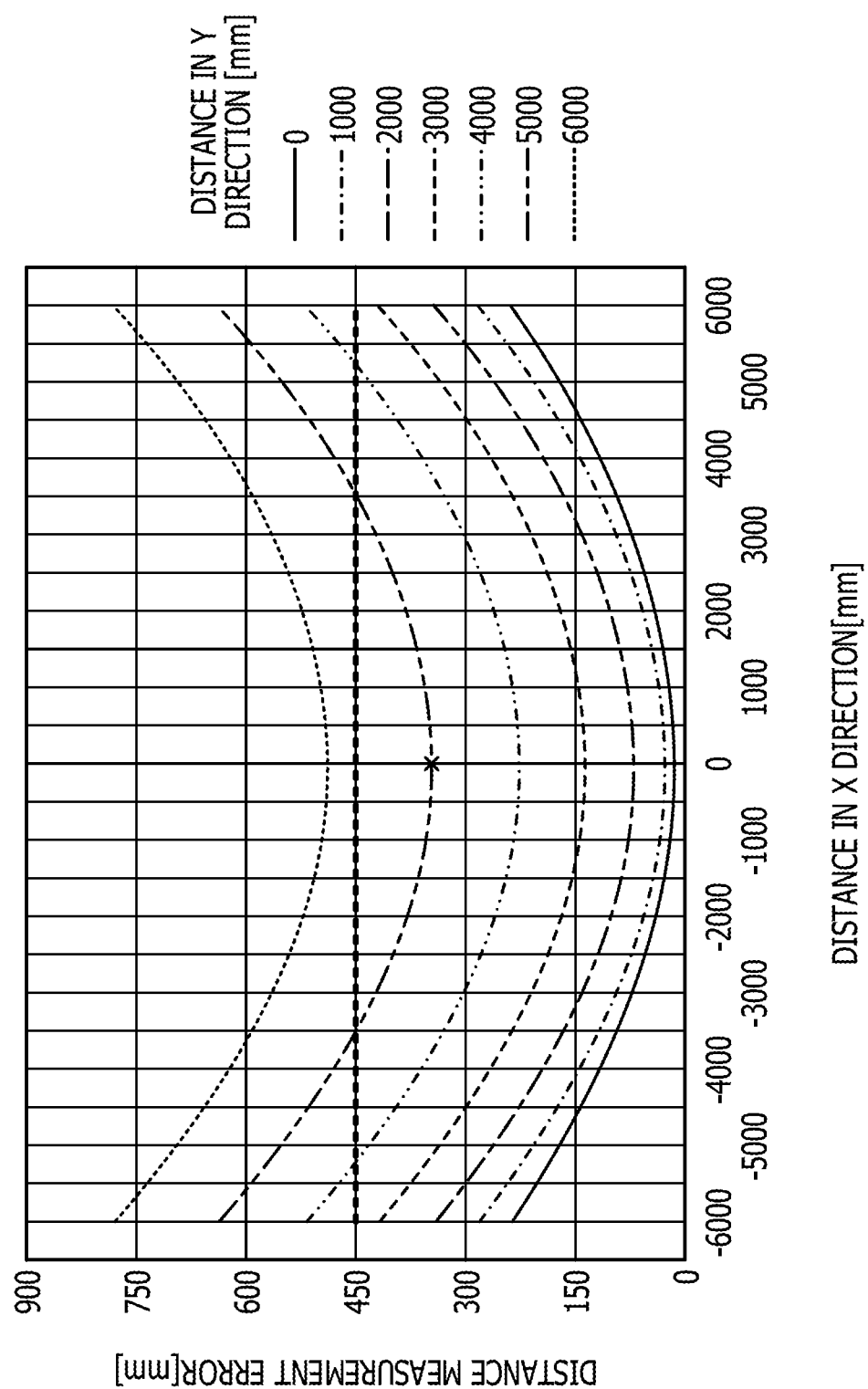

DISTANCE MEASUREMENT DEVICE AND DISTANCE MEASUREMENT METHOD

CROSS-REFERENCE TO RELATED APPLICATION

This application is based upon and claims the benefit of priority of the prior Japanese Patent Application No. 2016-238576, filed on Dec. 8, 2016, the entire contents of which are incorporated herein by reference.

FIELD

The embodiments discussed herein are related to a distance measurement device and a distance measurement method.

BACKGROUND

A technique for detecting a target object located near a vehicle, calculating a distance between the target object and the vehicle based on image data captured by a camera mounted on the vehicle, and controlling a movement of the vehicle in such a manner that the vehicle does not collide with the target object has been requested. In addition, it is preferable that a monocular camera be used due to a camera cost limitation, a mounting position limitation, and the like.

For example, as conventional techniques for detecting a target object from image data captured by a monocular camera, there are machine learning and optical flow. In addition, as conventional techniques for calculating a distance between a target object and a vehicle, there are a motion stereo method and a contact position determination method.

For example, in the machine learning, deep learning and characteristic amounts of histograms of oriented gradients (HoG) are used in some cases. The machine learning collects image data of a detected target object in advance, calculates characteristic amounts of the target object, and causes the calculated characteristic amounts to be held as classifiers. The machine learning compares the image data with the classifiers, executes matching to determine whether or not the image data includes a characteristic amount matching a characteristic amount included in the classifiers, and detects the target object included in the image data.

The optical flow detects characteristic points from image data and identifies a target object based on variations in coordinates of the characteristic points.

The motion stereo method measures a distance from a vehicle to a target object based on the amount of a movement of the vehicle and image data before and after the movement of the vehicle. In the motion stereo method, a movement amount of a vehicle may be accurately identified, and if a target object does not move, a distance between the vehicle and the target object may be measured with high accuracy.

The contact position determination method uses the machine learning or the optical flow to detect a target object from image data at a preliminary stage and geometrically calculates a distance between the target object and a vehicle based on coordinates of the detected target object on an image and a distortion table.

Examples of related art are Japanese Laid-open Patent Publication No. 2010-211578 and International Publication Pamphlet No. WO2008/065729.

SUMMARY

According to an aspect of the invention, a distance measurement device includes a memory, and a processor coupled to the memory and configured to detect a plurality of edge lines from image data received from a camera mounted on a moving object, identify a plurality of first edge lines that are among the detected plurality of edge lines and have a characteristic of a predetermined target object, search coordinates of a second edge line located at the lowest position from among the identified plurality of first edge lines, and measure a distance from the moving object to the predetermined target object based on the searched coordinates of the second edge line and a parameter of the camera.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a data structure of a buffer;

FIG. 3 is a diagram illustrating an example of a data structure of a camera parameter;

FIG. 5 is a diagram illustrating an example of a data structure of an angle determination table;

FIG. 14 is a diagram illustrating an example of a distance measurement error.

DESCRIPTION OF EMBODIMENTS

There is a problem that a distance from a moving object to a target object may not be accurately measured in the aforementioned techniques.

The motion stereo method accurately identifies the amount of a movement of a vehicle and identifies a distance between the vehicle and a target object on the premise that the target object does not move. Thus, in the motion stereo method, if the amount of the movement of the vehicle is not accurately identified or if the target object is a pedestrian, the distance may not be accurately identified.

In the contact position determination method, if a target object is a pedestrian, and positions at which shoe soles contact a road surface are accurately identified, a distance between the target object and a vehicle may be identified with high accuracy. However, if the positions at which the shoe soles contact the road surface are shifted by several pixels, a distance measurement error of several tens of centimeters may occur depending on the distance to the target object.

FIG. 14 is a diagram illustrating an example of the distance measurement error. FIG. 14 illustrates a distance measurement error in the case where the positions at which the shoe soles contact the road surface are shifted by 1 pixel on image data as an example. An ordinate illustrated in FIG. 14 indicates the distance measurement error, and an abscissa illustrated in FIG. 14 indicates a distance between a moving object and a target object in an X axis direction. A distance between the moving object and the target object in a Y axis direction is indicated by any of different lines. For example, when the distance between the moving object and the target object in the X axis direction is "0 mm", and the distance between the moving object and the target object in the Y axis direction is "5000 mm", the distance measurement error is "350 mm".

According to an aspect, the present disclosure aims to provide a distance measurement device and a distance measurement method that may accurately measure a distance from a moving object to a target object.

Hereinafter, embodiments of the distance measurement device disclosed herein and the distance measurement method disclosed herein are described in detail with reference to the accompanying drawings. The techniques disclosed herein is not limited by the embodiments.

First Embodiment

Figure 1:
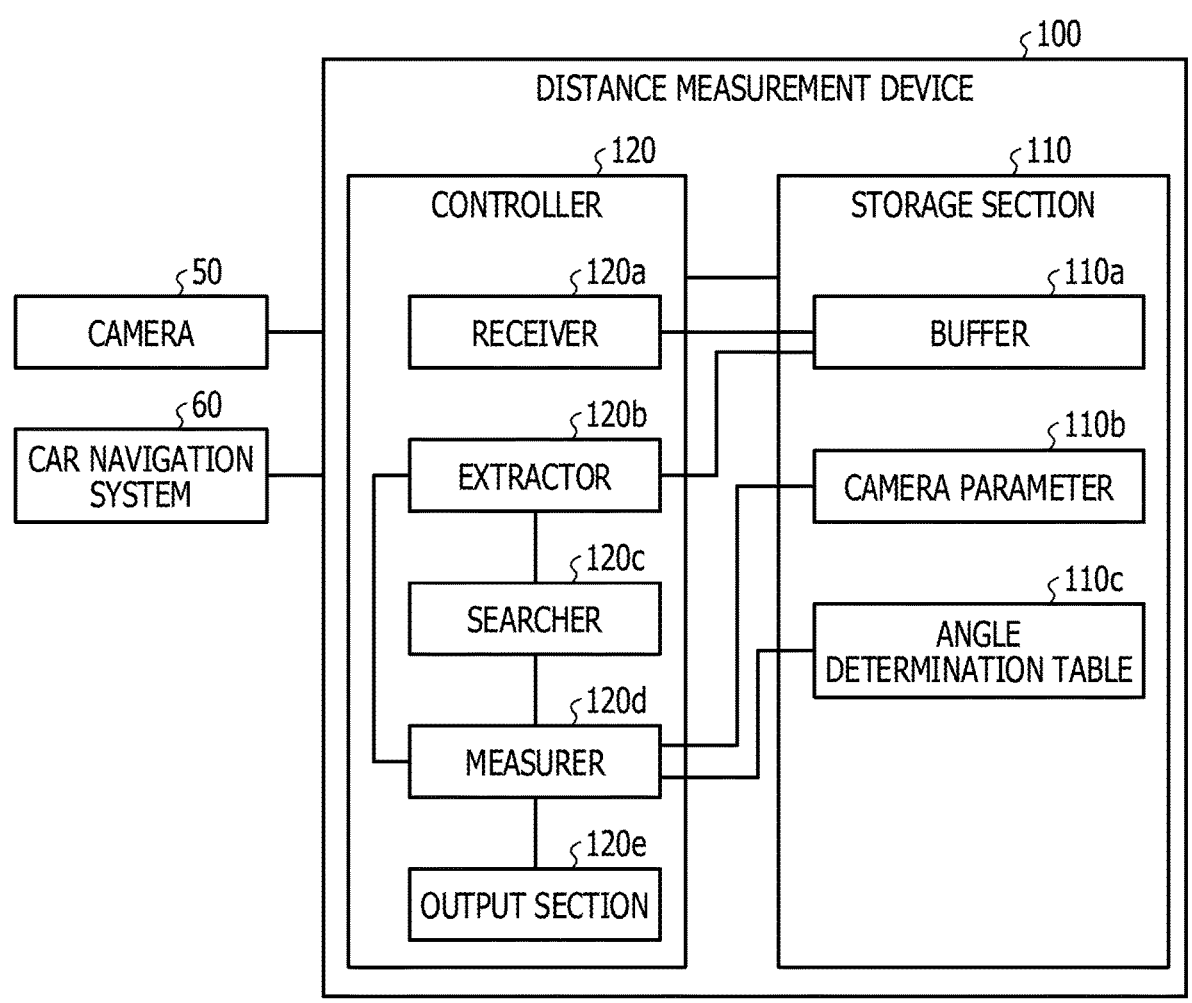
FIG. 1 is a functional block diagram illustrating a configuration of a distance measurement device according to a first embodiment.

FIG. 1 is a functional block diagram illustrating a configuration of a distance measurement device according to a first embodiment. As illustrated in FIG. 1, the distance measurement device 100 is connected to a camera 50 and a car navigation system 60.

The camera 50 is mounted on a vehicle on the rear side of the vehicle and captures an image of the rear side of the vehicle at a predetermined frame rate. The camera 50 outputs data of the captured image to the distance measurement device 100. Hereinafter, the data of the image captured by the camera 50 is referred to as image data.

The car navigation system 60 displays, on a display device, information of the current position of the vehicle and information of a target object included in the image data captured by the camera 50. For example, the car navigation system 60 displays, on the display device, information output from the distance measurement device 100 and indicating a distance from the vehicle to the target object. Although the first embodiment assumes that the target object is a pedestrian, the target object is not limited to this.

The distance measurement device 100 includes a storage section 110 and a controller 120. The storage section 110 includes a buffer 110a, a camera parameter 110b, and an angle determination table 110c. The storage section 110 corresponds to a semiconductor memory element such as a random access memory (RAM), a read only memory (ROM), or a flash memory, or a storage device such as a hard disk drive (HDD).

The buffer 110a stores image data captured by the camera 50. FIG. 2 is a diagram illustrating an example of a data structure of the buffer. As illustrated in FIG. 2, in the buffer, frame numbers are associated with the image data. The frame numbers are information uniquely identifying the image data. The image data is data of images captured by the camera 50.

The camera parameter 110b includes various types of information on the camera 50 mounted on the vehicle. FIG. 3 is a diagram illustrating an example of a data structure of the camera parameter. As illustrated in FIG. 3, the camera parameter 110b includes a horizontal position dx of the camera, a vertical position dy of the camera, a height position dz of the camera, a depression angle θ of the camera, a pan angle Ψ of the camera, and a rotational angle ρ of the camera.

Figure 4:
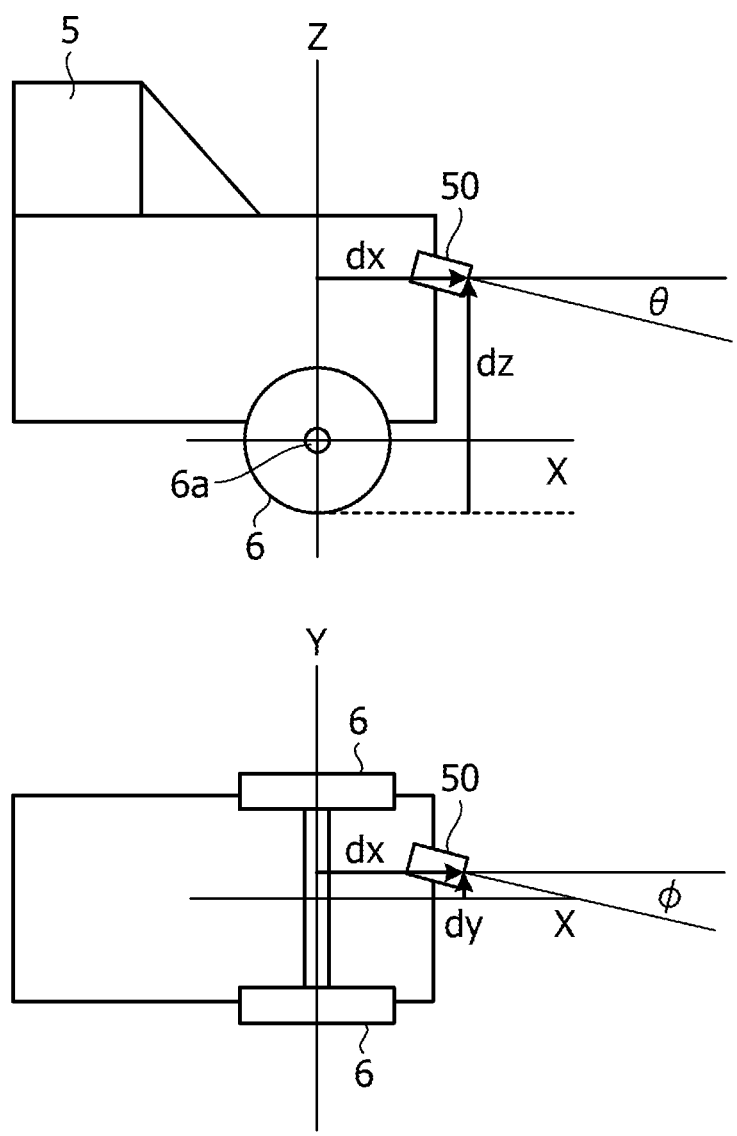
FIG. 4 is a diagram describing the camera parameter illustrated in FIG. 3.

FIG. 4 is a diagram describing the camera parameter illustrated in FIG. 3. In an example illustrated in FIG. 4, the camera 50 is mounted on a vehicle 5 on the rear side of the vehicle 5. For example, it is assumed that the center 6a of a rear wheel 6 of the vehicle 5 is used as a standard point and that an X axis, a Y axis, and a Z axis extend through the center 6a. Symbols illustrated in FIG. 4 correspond to the symbols illustrated in FIG. 3. In FIG. 4, an illustration of the rotational angle ρ is omitted.

The angle determination table 110c is information defining relationships between distances from the center of an image of image data to the target object and angles of view of the camera 50. FIG. 5 is a diagram illustrating an example of a data structure of the angle determination table. As illustrated in FIG. 5, in the angle determination table 110c, the distances Dy from the center of the image are associated with the angles θy of view. The distances Dy and the angles θy of view are described below.

Figure 6:
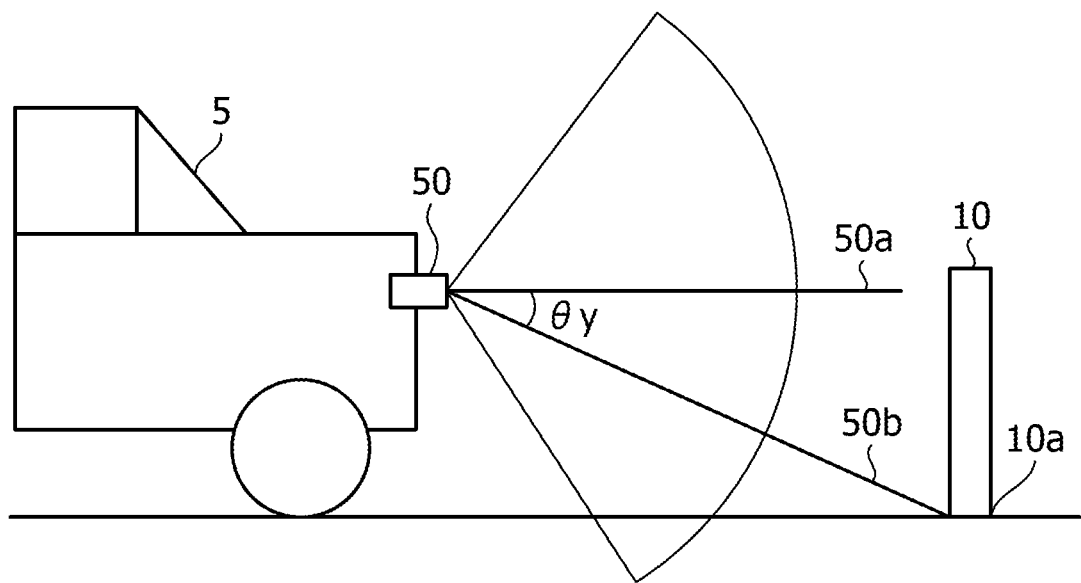
FIG. 6 is a diagram describing distances and angles of view that are included in the angle determination table.
Figure 6:
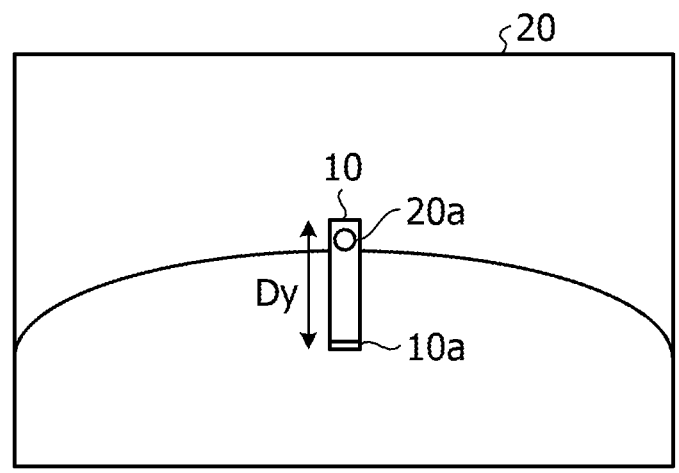

FIG. 6 is a diagram describing the distances Dy and the angles θy of view that are included in the angle determination table. For example, it is assumed that the center of an image of image data 20 is treated as a position 20a and that the lowest end of a target object 10 existing on the image data 20 is treated as a position 10a. A distance from the position 20a on the image data 20 to the position 10a on the image data 20 is Dy. In addition, if an angle of view that is associated with to the distance Dy is θy in the angle determination table 110c, an angle formed between an optical axis 50a illustrated in FIG. 6 and a line 50b illustrated in FIG. 6 is θy. The line 50b extends through the camera 50 and the lowest end 10a in a real space.

Return to FIG. 1. The controller 120 includes a receiver 120a, an extractor 120b, a searcher 120c, a measurer 120d, and an output section 120e. The controller 120 may be achieved by a central processing unit (CPU), a micro processing unit (MPU), or the like. Alternatively, the controller 120 may be achieved by hard-wired logic such as an application specific integrated circuit (ASIC) or a field programmable gate array (FPGA). Alternatively, the controller 120 may be a vehicle engine control unit (ECU).

The receiver 120a is a processing section that receives image data from the camera 50. Every time the receiver 120a receives image data from the camera 50, the receiver 120a associates the image data with a frame number and causes the image data to be stored in the buffer 110a.

The extractor 120b acquires image data from the buffer 110a and detects multiple edge lines from the acquired image data. The extractor 120b identifies multiple edge lines that are among the detected multiple edge lines and have a characteristic of a predetermined target object. The first embodiment assumes that the predetermined target object is a "pedestrian". The extractor 120b outputs, to the searcher 120c, information of the identified edge lines having the characteristic of the predetermined target object. The extractor 120b repeatedly executes the aforementioned process on all image data stored in the buffer 110a.

An example of a process, to be executed by the extractor 120b, of detecting the multiple edge lines from the image data is described below. The extractor 120b generates an edge image by using a sobel filter or a Laplacian filter for the image data. The extractor 120b may detect edge lines included in the edge image or may execute the following process. For example, the extractor 120b may compare the multiple edge lines included in the edge image with each other and repeatedly execute a process of synthesizing a pair of edge lines of which angles are close to each other and between which a distance is shorter than a threshold. In addition, the extractor 120b may remove, as noise, an edge line with a length shorter than a threshold.

An example of a process, to be executed by the extractor 120b, of identifying, from the detected multiple edge lines, the edge lines having the characteristic of the target object is described below. The extractor 120b compares a horizontal line set based on the height position dz included in the camera parameter 110b with the multiple edge lines and selects edge lines intersecting the horizontal line as candidate edge lines having the characteristic of the target object. Hereinafter, the candidate edge lines having the characteristic of the target object are referred to as "candidate edges".

The extractor 120b selects a pair of candidate edges from the multiple candidate edges. If a distance between the pair of candidate edges on the lower side of the selected candidate edges is smaller than a distance between the pair of candidate edges on the upper side of the selected candidate edges, or if the selected candidate edges are parallel to each other, the extractor 120b identifies the pair of candidate edges as edge lines having the characteristic of the target object.

Figure 7:
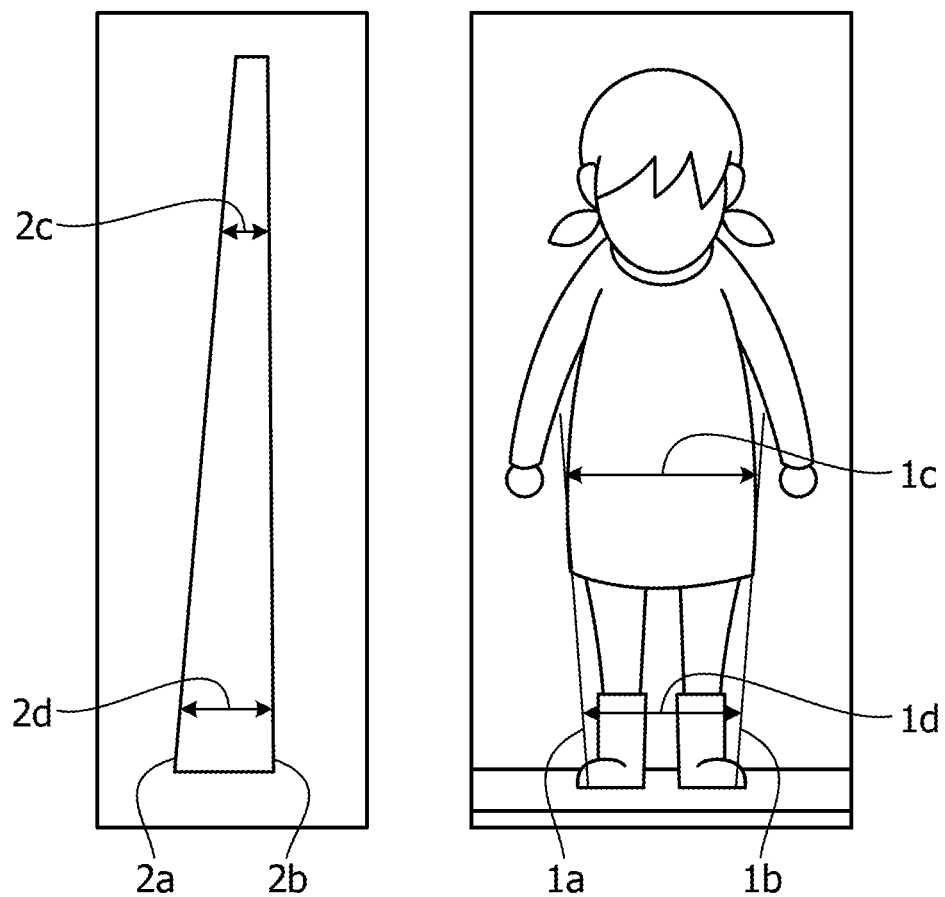
FIG. 7 is a diagram describing a process to be executed by an extractor according to the first embodiment.

FIG. 7 is a diagram describing a process to be executed by the extractor according to the first embodiment. A pair of candidate edges 1a and 1b illustrated in FIG. 7 is described below. As is apparent from the comparison of the candidate edges 1a and 1b, a distance id between the candidate edges 1a and 1b on the lower side of the candidate edges 1a and 1b is smaller than a distance 1c between the candidate edges 1a and 1b on the upper side of the candidate edges 1a and 1b. Thus, the extractor 120b identifies the candidate edges 1a and 1b as edge lines having the characteristic of the target object.

A pair of candidate edges 2a and 2b is described below. As is apparent from the comparison of the candidate edges 2a and 2b, a distance 2d between the candidate edges 2a and 2b on the lower side of the candidate edges 2a and 2b is larger than a distance 2c between the candidate edges 2a and 2b on the upper side of the candidate edges 2a and 2b. Thus, the extractor 120b removes the candidate edges 2a and 2b from the edge lines having the characteristic of the target object. The extractor 120b repeatedly executes the aforementioned process on pairs of the candidate edges, thereby identifying edge lines having the characteristic of the target object.

Return to FIG. 1. The searcher 120c is a processing section that searches coordinates of an edge line located at the lowest position based on the edge lines identified by the extractor 120b and having the characteristic of the target object. For example, the searcher 120c selects an edge line located at the lowest position from among the multiple edge lines and searches coordinates of the lowest end of the selected edge line. The searcher 120c outputs information of the searched coordinates of the lowest end of the edge line to the measurer 120d.

Figure 8:
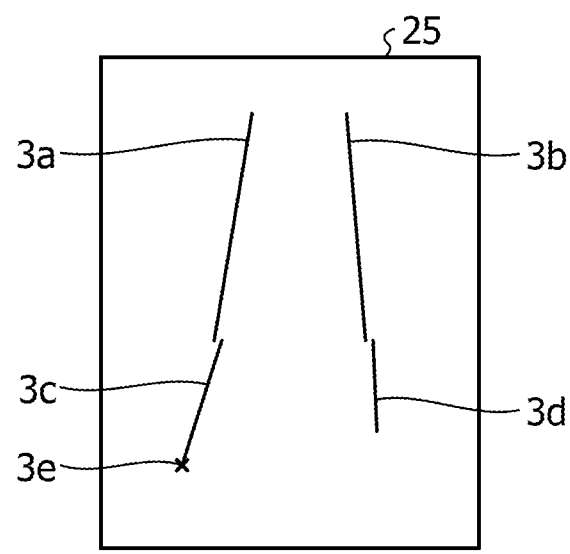
FIG. 8 is a diagram describing a process to be executed by a searcher according to the first embodiment.

FIG. 8 is a diagram describing a process to be executed by the searcher according to the first embodiment. In an example illustrated in FIG. 8, edge lines 3a to 3d having the characteristic of the target object are included in image data 25. The searcher 120c selects the edge line 3c located at the lowest position from among the edge lines 3a to 3d. The searcher 120c searches coordinates of a lowest end 3e of the selected edge line 3c.

Figure 9:
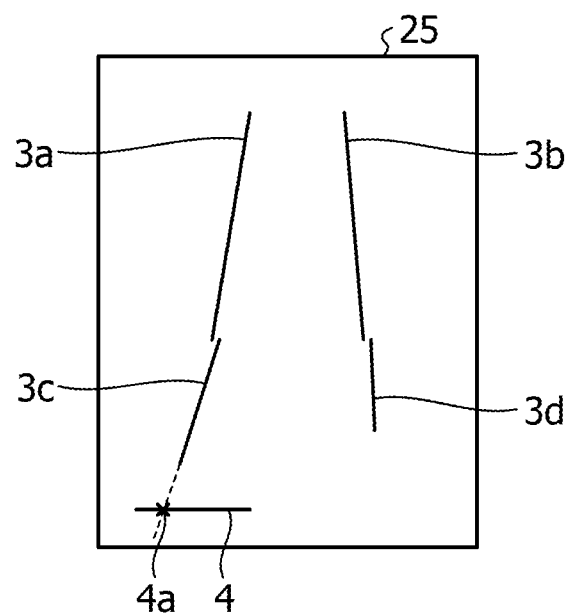
FIG. 9 is a diagram describing a process to be executed by the searcher according to the first embodiment.

The searcher 120c may execute the process described with reference to FIG. 8 and the following process. FIG. 9 is a diagram describing the process to be executed by the searcher according to the first embodiment. In an example illustrated in FIG. 9, the edge lines 3a to 3d having the characteristic of the target object are included in the image data 25. The searcher 120c selects the edge line 3c located at the lowest position from among the edge lines 3a to 3d.

Subsequently, the searcher 120c acquires, from the extractor 120b, information of an edge line included in the image data 25 and extending in the horizontal direction. If the searcher 120c extends the edge line 3c downward, and an edge that intersects an extended line of the edge line 3c and extends in the horizontal direction exists, the searcher 120c searches coordinates of an intersection at which the extended line intersects the edge extending in the horizontal direction. In the example illustrated in FIG. 9, the searcher 120c searches coordinates of an intersection 4a at which the extended line of the edge line 3c intersects an edge 4 extending in the horizontal direction. If an edge line that extends in the horizontal direction and intersects an extended line of an edge line (edge line having the characteristic of the target object) located at the lowest position exists, the searcher 120c outputs, to the measurer 120d, coordinates of an intersection of the extended line with the edge line extending in the horizontal direction as coordinates of the lowest end of the edge line.

Return to FIG. 1. The measurer 120d is a processing section that measures a distance from the vehicle to the target object based on the camera parameter 110b, the angle determination table 110c, and the coordinates of the lowest end of the edge line searched by the searcher 120c. The measurer 120d outputs information of the measured distance to the output section 120e. An example of a process to be executed by the measurer 120d is described below.

The measurer 120d compares a y coordinate of the lowest end with the angle determination table 110c and identifies an angle θ y of view. The measurer 120d calculates a distance D from the vehicle to the target object based on Equation (1). The measurer 120d outputs information of the calculated distance D to the output section 120e.

The distance $D$=the height position $dz$ of the camera $50$/tan $\theta y$     (1)

Equation (1) indicates the distance D in the case where the depression angle θ of the camera 50 is 0 for convenience sake. For example, if the depression angle θ is not 0, a conversion table in which coordinates on the image data are associated with unit vectors corresponding to capturing directions of the camera 50 is used. The measurer 120d compares the coordinates of the lowest end with the conversion table, calculates a unit vector, and calculates the distance D based on the height position dz of the camera 50 and the unit vector. As a process, to be executed by the measurer 120d, of calculating the distance D using the unit vector, a technique described in Japanese Laid-open Patent Publication No. 2010-258897 may be used, for example.

The output section 120e is a processing section that acquires the information of the distance D from the measurer 120d and outputs the acquired information of the distance D to the car navigation system 60.

Figure 10:
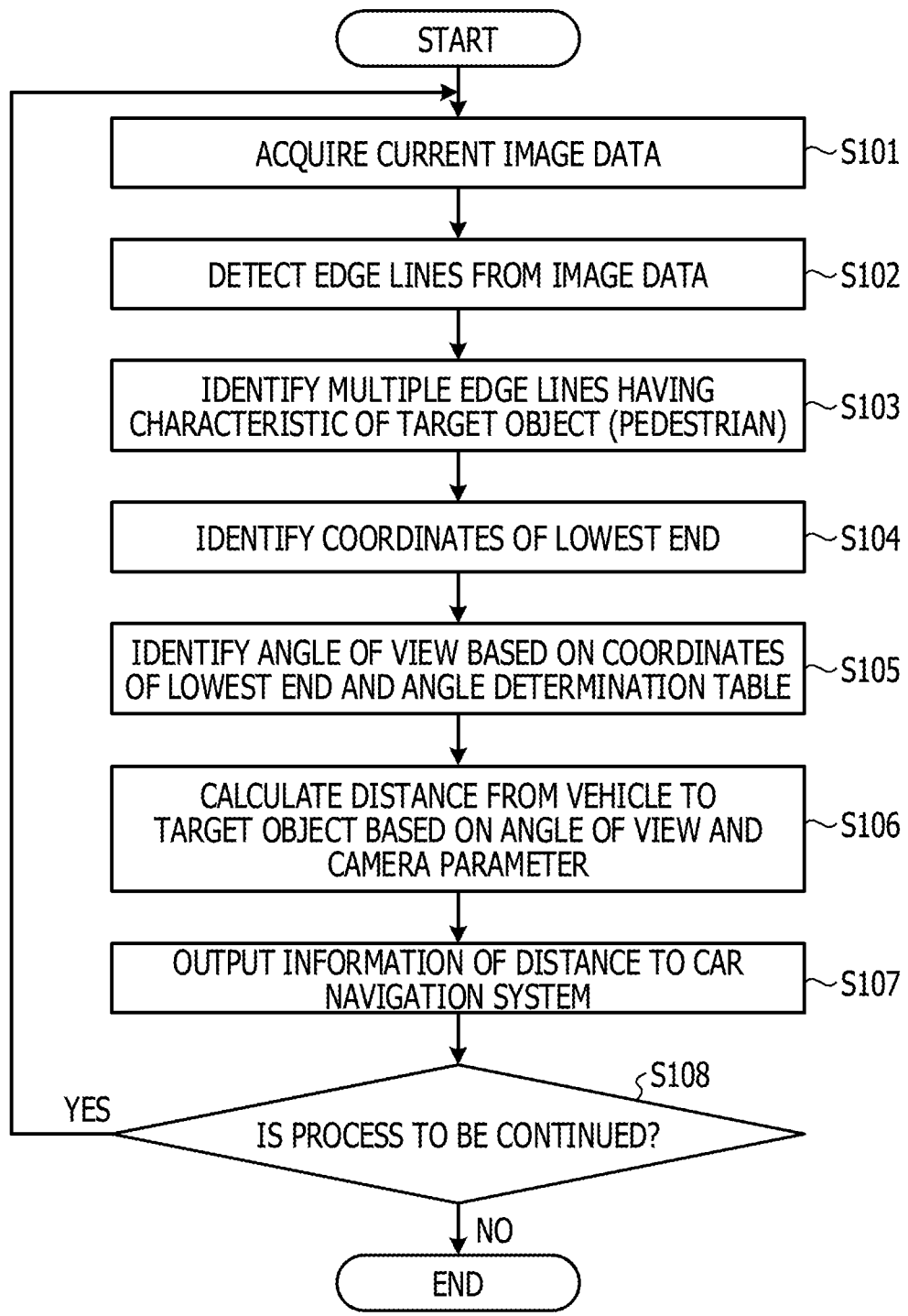
FIG. 10 is a flowchart of a process procedure of the distance measurement device according of the first embodiment.

Next, an example of a process procedure of the distance measurement device 100 is described. FIG. 10 is a flowchart of the process procedure of the distance measurement device according to the first embodiment. As illustrated in FIG. 10, the receiver 120a of the distance measurement device 100 acquires image data from the camera 50 (in step S101). The extractor 120b of the distance measurement device 100 detects edge lines from the image data (in step S102).

The extractor 120b identifies multiple edge lines having the characteristic of the target object (pedestrian) (in step S103). The searcher 120c of the distance measurement device 100 identifies coordinates of the lowest end of an edge line located at the lowest position among the identified multiple edge lines (in step S104). The measurer 120d of the distance measurement device 100 identifies an angle of view of the camera 50 based on the coordinates of the lowest end and the angle determination table 110c (in step S105).

The measurer 120d calculates a distance from the vehicle to the target object based on the angle of view and the camera parameter 110b (in step S106). The output section 120e of the distance measurement device 100 outputs information of the distance to the car navigation system 60 (in step S107).

If the distance measurement device 100 continues to execute the process (Yes in step S108), the distance measurement device 100 causes the process to proceed to step S101. If the distance measurement device 100 does not continue to execute the process (No in step S108), the distance measurement device 100 terminates the process.

Next, effects of the distance measurement device 100 according to the first embodiment are described. Since the distance measurement device 100 extracts edge lines included in image data and having the characteristic of the target object, searches coordinates of the lowest end of an edge line, and calculates a distance from the vehicle to the target object based on the coordinates of the lowest end, the distance measurement device 100 may accurately measure the distance from the moving object to the target object.

If a distance between a pair of edge lines on the lower side of the pair of edge lines is smaller than a distance between the pair of edge lines on the upper side of the pair of edge lines, or if the edge lines are parallel to each other, the distance measurement device 100 identifies the pair of edge lines as edge lines having the characteristic of the target object. Thus, the distance measurement device 100 may identify edge lines of the target object with high accuracy.

Second Embodiment

Figure 11:
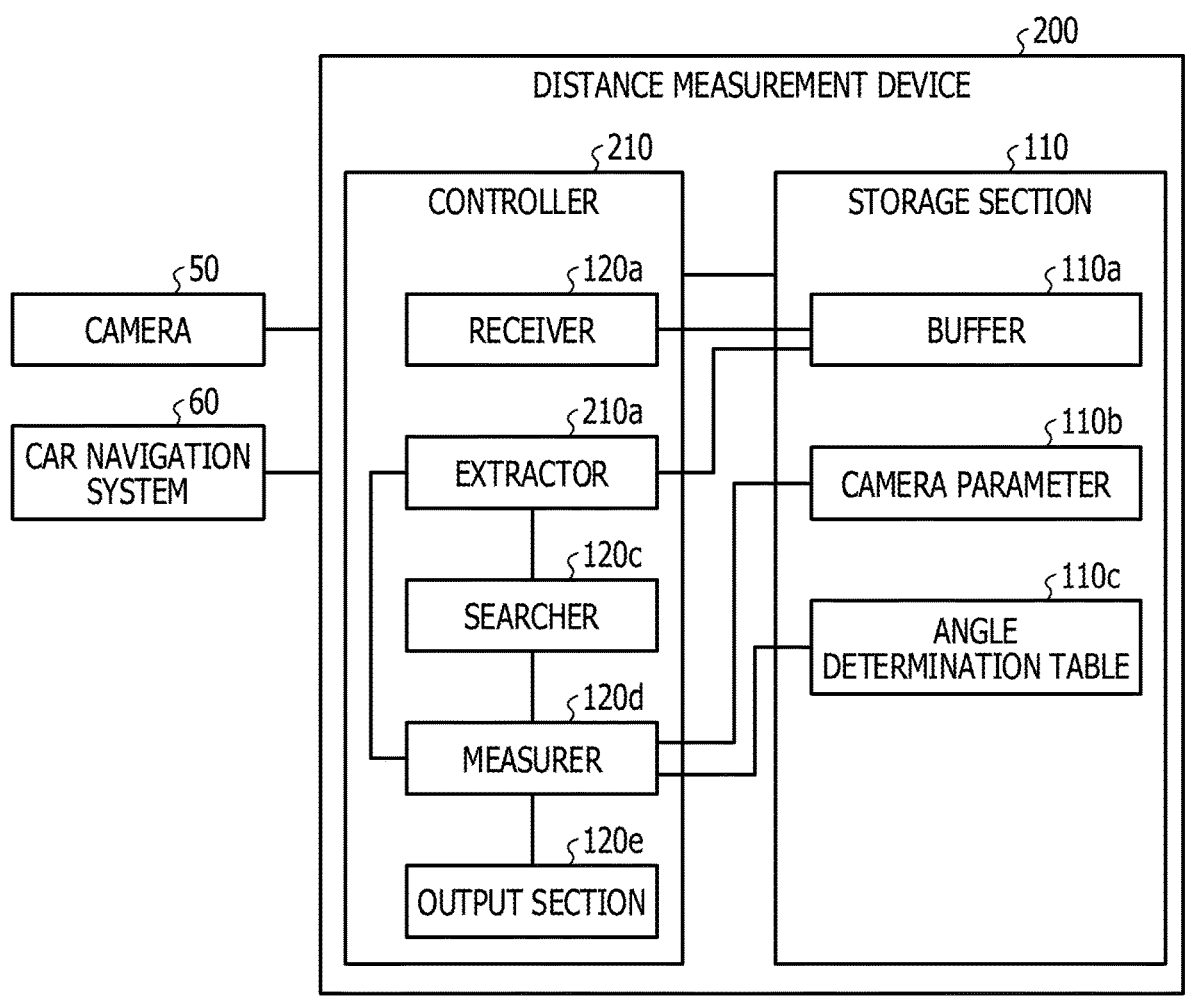
FIG. 11 is a functional block diagram illustrating a configuration of a distance measurement device according to a second embodiment.

Next, a configuration of a distance measurement device according to a second embodiment is described. FIG. 11 is a functional block diagram illustrating the configuration of the distance measurement device according to the second embodiment. As illustrated in FIG. 11, the distance measurement device 200 is connected to the camera 50 and the car navigation system 60. A description related to the camera 50 and the car navigation system 60 is the same as or similar to the description related to the camera 50 illustrated in FIG. 1 and the car navigation system 60 illustrated in FIG. 1.

The distance measurement device 200 includes the storage section 110 and a controller 210. The storage section 110 includes the buffer 110a, the camera parameter 110b, and the angle determination table 110c. The storage section 110 corresponds to a semiconductor memory element such as a RAM, a ROM, or a flash memory, or a storage device such as an HDD. A description related to the buffer 110a, the camera parameter 110b, and the angle determination table 110c is the same as or similar to the description related to the buffer 110a illustrated in FIG. 1, the camera parameter 110b illustrated in FIG. 1, and the angle determination table 110c illustrated in FIG. 1.

The controller 210 includes the receiver 120a, an extractor 210a, the searcher 120c, the measurer 120d, and the output section 120e. The controller 210 may be achieved by a CPU, an MPU, or the like. Alternatively, the controller 210 may be achieved by hard-wired logic such as an ASIC or an FPGA. Alternatively, the controller 210 may be a vehicle ECU. A description related to the receiver 120a, the searcher 120c, the measurer 120d, and the output section 120e is the same as or similar to the description related to the receiver 120a illustrated in FIG. 1, the searcher 120c illustrated in FIG. 1, the measurer 120d illustrated in FIG. 1, and the output section 120e illustrated in FIG. 1.

The extractor 210a acquires current image data and immediately preceding image data from the buffer 110a. Hereinafter, the immediately preceding image data is referred to as past image data. The extractor 210a calculates differential image data between the current image data and the past image data and identifies, based on the differential image data, a search region in which the target object exists. For example, the extractor 210a identifies pixels corresponding to pixels that are included in the differential image data and of which values are equal to or larger than a threshold, and repeatedly executes a process of coupling pixels that are among the identified pixels and adjacent to each other. If a region of the coupled pixels is larger than a predetermined region, the extractor 210a identifies the region of the coupled pixels as a search region.

The extractor 210a identifies, from the search region included in the current image data, multiple edge lines having the characteristic of the target object and outputs information of the identified edge lines to the searcher 120c. A process, to be executed by the extractor 210a, of identifying the multiple edge lines having the characteristic of the target object is the same as or similar to the process to be executed by the extractor 120b illustrated in FIG. 1.

Although a process, to be executed by the extractor 210a, of identifying the search region based on the differential image data is described above, the extractor 210a may execute another process to identify the search region. For example, the extractor 210a may identify the search region based on flow amounts of characteristic points of the image data or may use target object's characteristics learned by machine learning and identify the search region.

An example of a process, to be executed by the extractor 210a, of identifying the search region based on the flow amounts of the characteristic points of the image data is described below. The extractor 210a extracts the characteristic points from the past image data and the current image data and associates characteristic points on the past image data with characteristic points on the current image data based on characteristic amounts of the characteristic points. The extractor 210a treats, as flow amounts, movement amounts of the characteristic points associated with each other. The extractor 210a calculates the flow amounts for pairs of the characteristic points and classifies the flow amounts into groups based on the flow amounts. The extractor 210a identifies, as the search region, a region surrounding characteristic points that correspond to flow amounts of the same group and of which the flow amounts are equal to or smaller than a certain value. The extractor 210a uses a technique such as Harris corner detection to extract the characteristic points.

An example of a process, to be executed by the extractor 210a, of identifying the search region using the target object's characteristics learned by the machine learning is described below. The extractor 210a has a machine learning function and collects, in advance, image data of the target object to be detected, calculates characteristic amounts of the target object, and holds the characteristic amounts as classifiers. The extractor 210a compares the classifiers with the image data and executes matching to determine whether or not the image data includes a characteristic amount matching a characteristic amount included in the classifiers, thereby identifying a range of the target object included in the image data. The extractor 210a treats, as the search region, the range of the target object included in the image data.

Figure 12:
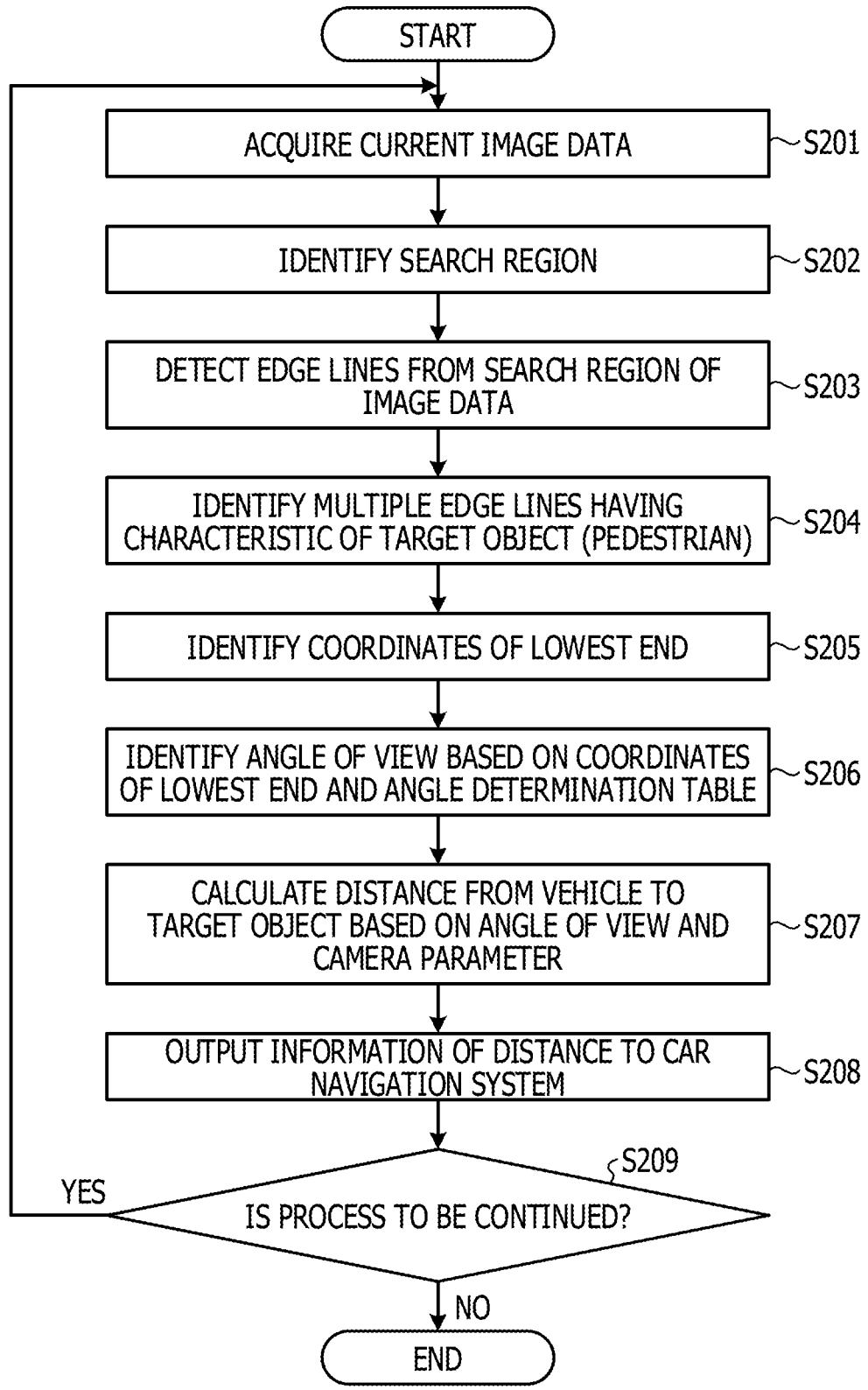
FIG. 12 is a flowchart of a process procedure of the distance measurement device according of the second embodiment.

Next, an example of a process procedure of the distance measurement device 200 according to the second embodiment is described. FIG. 12 is a flowchart of the process procedure of the distance measurement device according to the second embodiment. As illustrated in FIG. 12, the receiver 120a of the distance measurement device 200 acquires image data from the camera 50 (in step S201). The extractor 210a of the distance measurement device 200 identifies a search region in which the target object exists (in step S202). The extractor 210a detects edge lines from the search region of the image data (in step S203).

The extractor 210a identifies multiple edge lines having the characteristic of the target object (pedestrian) (in step S204). The searcher 120c of the distance measurement device 200 identifies coordinates of the lowest end of an edge line located at the lowest position among the identified multiple edge lines (in step S205). The measurer 120d of the distance measurement device 200 identifies an angle of view of the camera 50 based on the coordinates of the lowest end and the angle determination table 110c (in step S206).

The measurer 120d calculates a distance from the vehicle to the target object based on the angle of view and the camera parameter 110b (in step S207). The output section 120e of the distance measurement device 200 outputs information of the distance to the car navigation system 60 (in step S208).

If the distance measurement device 200 continues to execute the process (Yes in step S209), the distance measurement device 200 causes the process to proceed to step S201. If the distance measurement device 200 does not continue to execute the process (No in step S209), the distance measurement device 200 terminates the process.

Next, effects of the distance measurement device 200 according to the second embodiment are described. The distance measurement device 200 uses differential image data, flow amounts, or machine learning to identify a search region and extracts edge lines having the characteristic of the target object from the identified search region. Since the range to be extracted is reduced by this method, a load to be applied to the distance measurement device 200 may be reduced. In addition, since an edge line is not extracted from a moving object, an effect of noise may be reduced.

Figure 13:
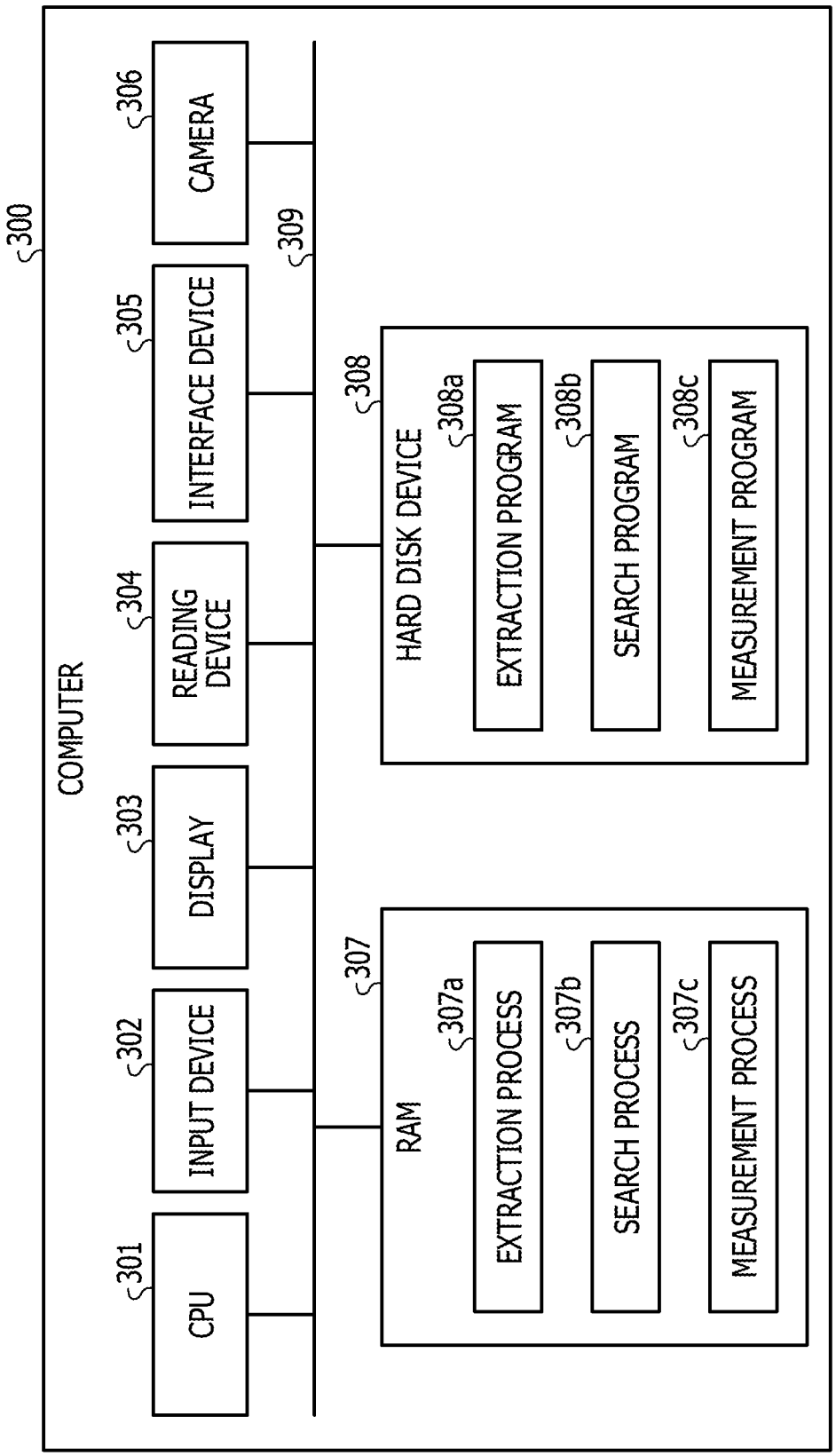
FIG. 13 is a diagram illustrating an example of a hardware configuration of a computer that achieves the same functions as the distance measurement devices.

Next, an example of a hardware configuration of a computer that achieves the same functions as the distance measurement devices 100 and 200 described in the embodiments is described. FIG. 13 is a diagram illustrating the example of the hardware configuration of the computer that achieves the same functions as the distance measurement devices.

As illustrated in FIG. 13, the computer 300 includes a CPU 301 that executes various types of arithmetic processing, an input device 302 that receives data input by a user, and a display 303. The computer 300 also includes a reading device 304 that reads a program and the like from a storage medium, an interface device 305 that transmits and receives data to and from another computer via a network, and a camera 306. The computer 300 also includes a RAM 307 that temporarily stores various types of information, and a hard disk device 308. The devices 301 to 308 are connected to a bus 309.

The hard disk device 308 includes an extraction program 308a, a search program 308b, and a measurement program 308c. The CPU 301 reads the extraction program 308a, the search program 308b, and the measurement program 308c and loads the extraction program 308a, the search program 308b, and the measurement program 308c into the RAM 307.

The extraction program 308a functions as an extraction process 307a. The search program 308b functions as a search process 307b. The measurement program 308c functions as a measurement process 307c.

The extraction process 307a corresponds to the processes to be executed by the extractors 120b and 210a. The search process 307b corresponds to the processes to be executed by the searcher 120c. The measurement process 307c corresponds to the processes to be executed by the measurer 120d.

The programs 308a to 308c may not be stored in the hard disk device 308 in an initial state. For example, the programs 308a to 308c may be stored in a "portable physical medium" that is to be inserted in the computer 300 and is a flexible disk (FD), a CD-ROM, a DVD, a magneto-optical disc, an IC card, or the like. The computer 300 may read the programs 308a to 308c from the portable physical medium and execute the programs 308a to 308c.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distance measurement device comprising:
   a memory; and
   a processor coupled to the memory and configured to:
   detect a plurality of edge lines from image data received from a camera mounted on a moving object;
   select two edge lines from among the plurality of the detected edge lines;
   remove the selected two edge lines from a plurality of first edge lines having a characteristic of a predetermined target object when a distance between the selected two edge lines on the lower side of the selected two edge lines is larger than a distance between the selected two edge lines on the upper side of the selected two edge lines;
   identify the plurality of the first edge lines, except the removed two edge lines, that have the characteristic of the predetermined target object;
   search coordinates of a second edge line located at the lowest position from among the identified plurality of first edge lines; and measure a distance from the moving object to the predetermined target object based on the searched coordinates of the second edge line and a parameter of the camera.

2. The distance measurement device according to claim 1,
wherein the processor identifies, based on differential image data between past image data received from the camera and current image data received from the camera, a search region in which the predetermined target object exists, and
wherein the processor detects the plurality of edge lines from the search region included in the current image data.

3. The distance measurement device according to claim 1,
wherein the processor executes a process of calculating a flow amount for each of characteristic points on past image data received from the camera based on the positions of the characteristic points and positions corresponding to the characteristic points and located on current image data received from the camera,
wherein the processor identifies a region including characteristic points of which flow amounts are equal to or smaller than a certain value, and
wherein the processor detects a plurality of edge lines from the identified region.

4. The distance measurement device according to claim 1,
wherein the processor learns the characteristic of the predetermined target object,
wherein the processor identifies, based on the learned characteristic and the image data captured by the camera, a region in which the predetermined target object exists, and
wherein the processor detects a plurality of edge lines from the identified region.

5. A distance measurement method comprising:
detecting, by a processor, a plurality of edge lines from image data received from a camera mounted on a moving object;
selecting, by a processor, two edge lines from among the plurality of the detected edge lines;
removing, by a processor, the selected two edge lines from a plurality of first edge lines having a characteristic of a predetermined target object when a distance between the selected two edge lines on the lower side of the selected two edge lines is larger than a distance between the selected two edge lines on the upper side of the selected two edge lines;
identifying, by a processor, the plurality of the first edge lines, except the removed two edge lines, that have the characteristic of the predetermined target object;
searching, by a processor, coordinates of a second edge line located at the lowest position from among the identified plurality of first edge lines; and
measuring, by a processor, a distance from the moving object to the predetermined target object based on the searched coordinates of the second edge line and a parameter of the camera.

* * * * *